United States Patent [19]
Hanss

[11] 3,908,838
[45] Sept. 30, 1975

[54] DRAGLINE CONVEYOR

[75] Inventor: Paul Hanss, Reichenbach, Baden, Germany

[73] Assignee: Elba Werk, Maschinen-Gesellschaft mbH & Co., Ettlingen, Baden, Germany

[22] Filed: Sept. 23, 1974

[21] Appl. No.: 508,614

[30] Foreign Application Priority Data
Sept. 21, 1973 Germany............................ 2347476

[52] U.S. Cl. ...................... 214/10; 37/116; 198/36; 214/152
[51] Int. Cl.² ......................................... B65G 59/00
[58] Field of Search ........ 37/115, 116; 214/10, 152, 214/93; 198/36

[56] References Cited
UNITED STATES PATENTS

| 3,488,036 | 1/1970 | Feger et al. | 37/116 X |
| 3,556,317 | 1/1971 | Vidal | 37/115 X |
| 3,605,987 | 9/1971 | Sigismondo | 37/116 X |
| 3,851,749 | 12/1974 | Vidal | 214/10 X |

FOREIGN PATENTS OR APPLICATIONS

| 1,481,173 | 1/1969 | Germany | 37/115 |

*Primary Examiner*—Frank E. Werner
*Attorney, Agent, or Firm*—Ernest G. Montague; Karl F. Ross; Herbert Dubno

[57] ABSTRACT

The invention relates to an apparatus and a method for self-actuated scooping-up of particulate matter stored in a sector-shaped storage space provided with a partition to separate a non-active supply of material from an active supply thereof. The apparatus includes traction and backhaul cables attached to a container guided via respective cable drums and switches controlling the forward and rearward movement thereof. By means of a coupling unit selectively connecting and disconnecting a positively-locking electrically-powered drive to a backhaul cable-drum, and induction and lamellar brakes selectively controlling respective cable portions via respective cam switches, the container scoopes up particulate matter from a low starting position up to the partition, unloads the particulate matter beyond the partition into the active material supply, swings up and travels towards the free end of the derrick up to a predetermined point, thereupon swinging through an arc to a vertically downward path and returning to its starting position, the backhaul cable remaining taut during the scooping-up process and during lowering of the container.

6 Claims, 3 Drawing Figures

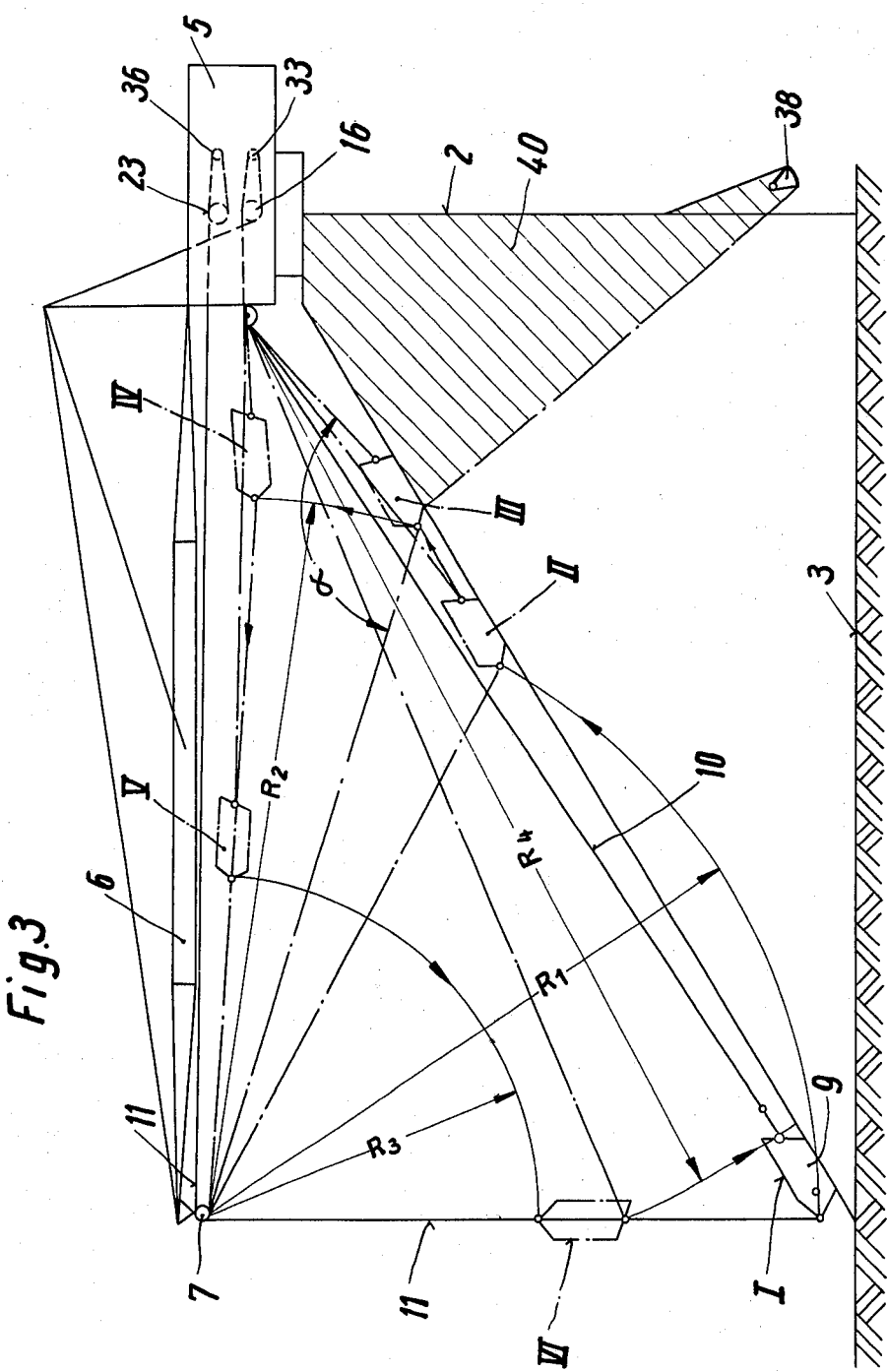

DRAGLINE CONVEYOR

FIELD OF THE INVENTION

The invention relates to an apparatus and a method for self-actuated scooping up of particulate matter stored in a sector-shaped storage space provided with a partition to separate a non-active layer from an active layer of material, and unloading the scooped-up matter into the active layer for feeding the latter, for example, to a cement-preparation plant.

BACKGROUND OF THE INVENTION

An apparatus for self-actuating transport of scooped matter is known, in which a derrick attached to a feeder and having a free end is coupled on one end to a rotatable chassis. (DT-OS 1 506 469). In order to automatically operate the container bearing the scooped-up material both the traction cable and the backhaul cable are guided via mutually independent cable portions over two separate cable drums, which are disposed on a common shaft driven by a motor, the cable drum receiving the traction cable being positively coupled with the shaft, and the cable drum receiving the backhaul cable being freely rotatable around the shaft but couplable thereto. The amount of respective sagging and tension in the cable for the return of the container while hovering above the stored material upon completion of the conveyance process is regulated by a control guiding the rotations of both cable drums and actuated by the drive thereof. (DT-PS 1 481 173).

These automatic self-actuated plants for scooping up material have been proven and shown to be effective in practice, since their operation no longer required the use of an operator previously needed to handle associated couplings and brakes. It has, however, been shown that automatic plants of the above kind have not been able to operate as efficiently in the long run as corresponding manually operated plants, other conditions, such as efficiency and power of the drive, size of the container, length of the derrick and velocity of the scooping-up movement, being equal. This is primarily due to the fact that the travel of the container for scooping up material is largely predetermined in an automatically operating plant, while an operator can tailor the movement of the container by appropriate actuation of the coupling and respective brakes for the traction- and backhaul cables to practically all and any eventualities. He is thus in a position, for example, to shorten the conveyance path to quickly resupply the container with any missing material, to extend the travel of the container beyond the normal reach to recover any material lying beyond the allotted storage space, but primarily to unload the container completely at the end of the conveyance process.

Automatic known plants of the above kind are, however, of necessity, operating at a lower efficiency primarily due to an incomplete unloading of the container and an unintended return of some scooped-up matter to the storage place from where it was originally scooped up. A further functional impairment of this type of plant is often due to the fact that the active layer of material, i.e. that part of the layer which as a result of its own weight passes through an opened lock of the feeder, is used up. The moving container, upon reaching that active region, then quickly slides down within that region dragging along with it any loose portion of the backhaul cable, and thus brings the whole motion of the cable into disarray. The advantage of not requiring any operating personel however, largely offsets such possible impairments of the operation of an automatic plant for scooping up material against the advantages of a manually operated plant.

To offset such impaired operating efficiency, one has simply resorted to the use of operating plants having a larger capacity. This has consequently spurred a demand for constantly larger plants capable of handling, for example, even the largest cement-preparation plants. This has, in turn, led to the use of stronger electric drive-motors, couplings and brakes, which has resulted in larger loads. Switching these stronger motors in and out of use is, on one hand, limited by the current capacity of the supply network, and on the other hand by the motor itself, which can only withstand for a limited time the heat generated by the high magnitude of the starting current; this fact limits the use of electric motors as drives for such plants. Additionally the starting characteristics of the induction motors usually used causes an abrupt reversal of the movements of the container scooping-up material. The resulting impulses passing through the whole system result in a less then smooth operation thereof and cause an increased wear and tear of all operating parts. The resulting high temperatures also cause the couplings and brakes to perform in an unequal manner, which in turn leads to an imprecise determination of cable lengths possibly causing severe operating disturbances.

OBJECT OF THE INVENTION

It is accordingly an object of my invention to obviate the above disadvantages and to devise a self-actuated plant of the aforesaid kind capable of handling even the largest loads and which is easily manufacturable and also economic in operation.

SUMMARY OF THE INVENTION

The drive and control of plants of the above kind is therefore designed so that the backhaul cable is prevented from being unwound from the backhaul cable-drum at the commencement of the conveying operation, so that only the traction cable is wound upon the traction cable-drum until the length of the backhaul cable hanging from a guide pulley is used up, whereupon the backhaul cable-drum is recoupled to the traction cable drum. Upon reaching a partition separating the active from the non-active layer the movement of the backhaul cable-drum is again arrested, the traction cable-drum continuing to move, until the angle enclosed between the traction- and backhaul cables has substantially approached 180° upon the lifting of the container, whereupon the container is returned towards the free end of the derrick, the traction-and back-haul cable drums rotating then in opposite directions.

The drive of the self-actuated plant for scooping up material is carried out by an electric motor driving a traction cable-drum via a displacement pump and a hydraulic motor connected in turn to a coupling couplable to, and decouplable from a backhaul cable-drum.

A positively-locking drive couples the backhaul cable-drum to two brakes, one of which, being an induction brake, holds the backhaul cable controllably taut during the scooping-up process and during lowering of the container, the other one being a lamellar brake arresting the movement of the backhaul cable-drum when the container is lifted.

The traction- and backhaul cable drums are additionally coupled to respective cam switches which control the displacement pump, the coupling, and respective brakes during the various operating movements of the container. Shafts of the cam switches move respective traction- and backhaul cables in a one-to-one correspondence with the movements of the respective shafts perimeters.

The particular advantage of the plant according to my invention resides in the fact that the drive is accomplished by a single electric motor, which in turn drives a following hydraulic system, which in turn ensures a reliable unloading of the container into the active layer, the movement of the container being disturbance-free and taking place at the most favorable velocity corresponding to respective operating phases thereof. Any disadvantageous sliding down of the container into an emptied active supply and a corresponding slackening of the cable is prevented through a novel motion-control of the container, and the operation of the automatically controlled plant largely approximates that of a manually-regulated plant.

BRIEF DESCRIPTION OF THE DRAWING

The above features of my invention will be better understood with reference to the accompanying drawing in which:

FIG. 3 shows the various operating phases of the container during a complete operating cycle of the plant.

SPECIFIC DESCRIPTION

Figure 1:
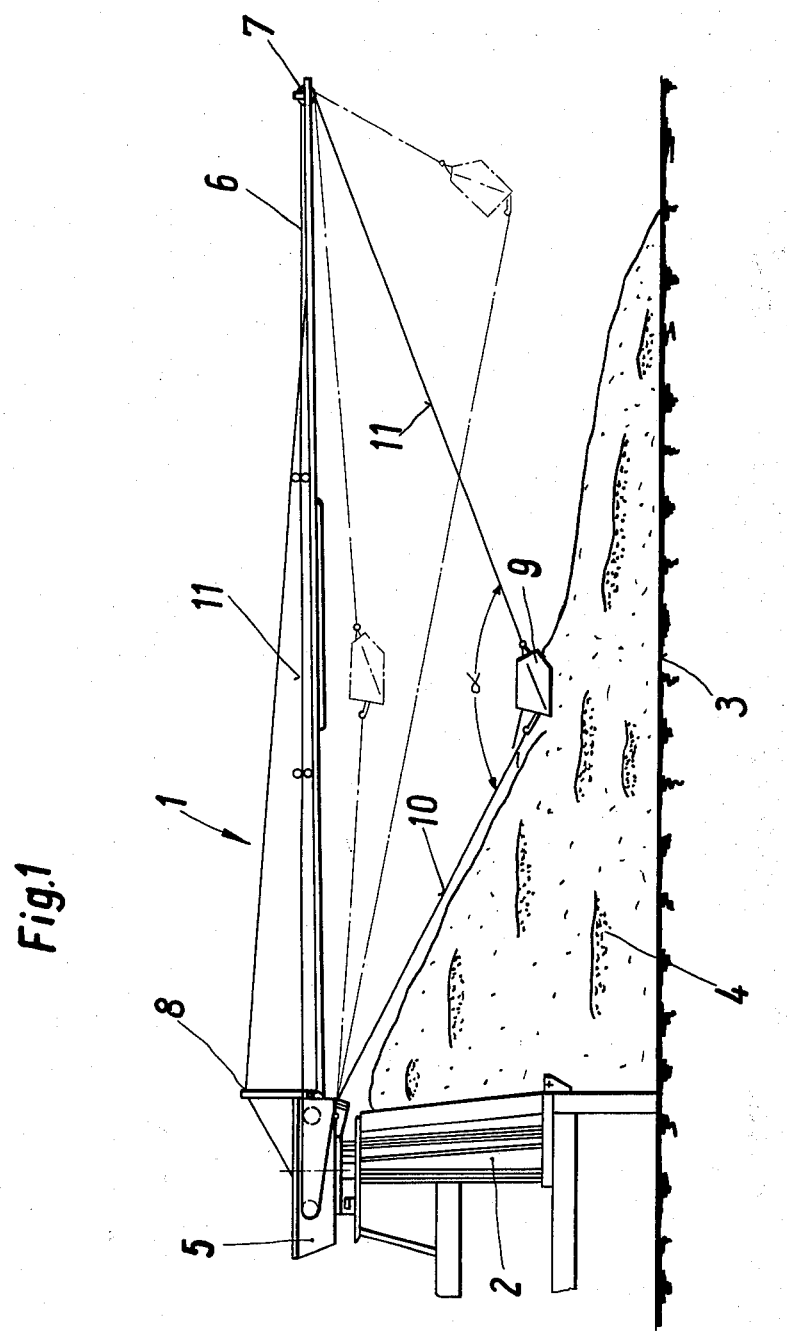
FIG. 1 shows a schematic view of a self-actuating plant for scooping-up particulate matter.

As can be seen best from FIG. 1 a particulate-material conveyor 1 for self-actuating transport of particulate matter is mounted on a feeder 2 which serves a rear-ward termination of a sector-shaped storage-space 3 of the particulate matter and against which piles of particulate material 4 abuts. Particulate-material conveyor 1 consists essentially of a rotatable chassis or turntable 5, a hingeably attached derrick or boom 6 having a guide pulley 7 on its free end, a guy 8, a particulate-material container or bucket 9, a traction cable 9 and a backhaul cable 11. The cables, bucket, boom and chassis form a dragline bucket machine of the self-filling type.

Figure 2:
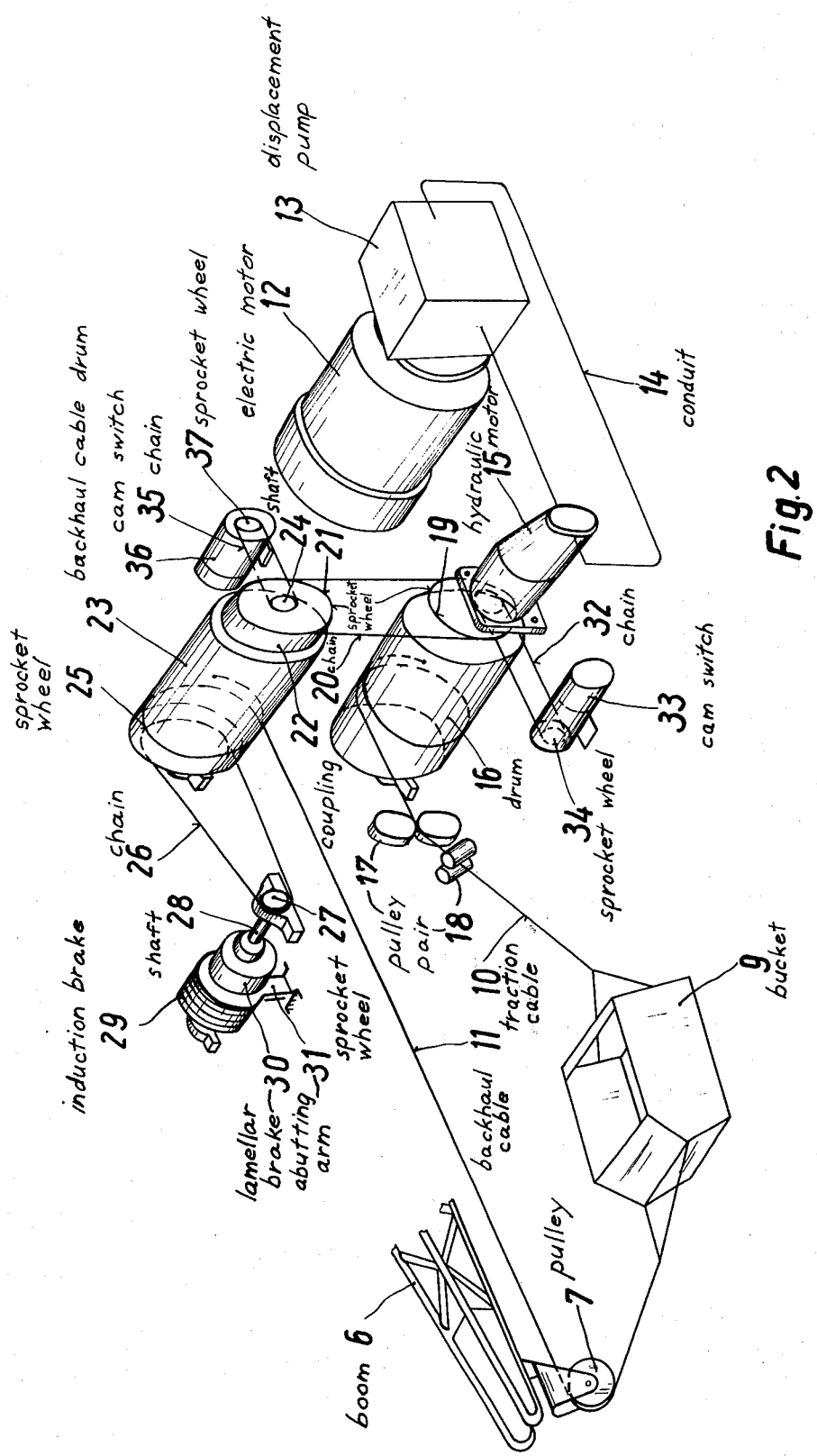
FIG. 2 shows the drive for a plant of the aforesaid type.

As can be best seen from FIG. 2 within chassis 5 there is disposed a drive for the conveyor including an electric motor 12 which drives a displacement pump 13 of a closed hydraulic system and is connected via a conduit 14 with a hydraulic motor 15.

A drum 16 of the dragline winch is firmly coupled to hydraulic motor 15, traction cable 9 being attached thereto and being guided via pulley pairs 17 and 18 to particulate-material container 9. A sprocket wheel 19 is also firmly coupled to hydraulic motor 15 and traction cable 10, which transfers the latter's rotation and torque to a coupling 22 via a chain 20 and a sprocket wheel 21. Coupling 22, when not under pressure, is closed and when subjected to pressure, opens, and acts on a backhaul cable-drum 23 which is attached with coupling 22 to a common shaft 24 and also carries backhaul cable 11 guided by pulley 7 on the free end of derrick 6 to the rear end of particulate-material container 9. The drive for backhaul cable-drum 23 via coupling 22 is therefore arranged to move both cables 10 and 11 in the same direction when coupling 22 is closed; thus when traction cable 10 is wound upon traction cable-drum 10, backhaul cable 11 is unwound from backhaul cable-drum 23.

Also firmly coupled to backhaul cable-drum 23 is a sprocket wheel 25 constituting together with a chain 26 and a wheel 27 a chaindrive moving shaft 28. Coupled to shaft 28 is an induction brake 29 which acting as a delaying brake keeps backhaul cable 11 controllably taut during the conveying process and particularly during the lowering of particulate-material container 9 from the tip of derrick 6 to storage space 3, and a lamellar brake 30 which stops backhaul cable 11 from proceeding further towards the end of the conveying process thus lifting container 9 up; the resulting braking moment abuts against an arm 31.

Additionally a cam-switch 33 is positively coupled via a chain 32 and a sprocket wheel 34 to traction cable 10 and correspondingly a camswitch 36 is positively coupled via a sprocket wheel 37 to backhaul drum 23. The rigid connection of cam switches 33 and 36 to respective cable drums 16 and 23 correspondingly applies also to the cable-paths of traction cable 10 and backhaul cable 11, so that the cable-paths correspond to the switching paths of respective cams in cam switches 33 and 36.

The particulate-material conveyor functions in a way best illustrated in FIG. 3 as follows;

The location of container 9 lowered to storage space three-position I- will be taken as the starting point of the operation and electric motor 12 will be assumed to be operating at this time. The electric adjustment of pump 19 is set to the required amount of material to be conveyed by the container via a timing relay and corresponds to a certain velocity of the cable tailored to the properties of the selected particulate-matter. Backhaul cable-drum 23 at that time is decoupled from coupling 22. Traction cable-drum 16, coupled rigidly to fluid motor 15 then starts to move, winds up traction cable 10 and consequently lifts container 9, which is being filled by particulate matter, in the direction towards feeder 2. At the beginning of the conveying process part of backhaul cable 11 is loose, since part $R_1$ of the cable hanging from guiding pulley 7 follows container 9. Only upon length $R_1$ of backhaul cable 11 having been used up and becoming taut, i.e. when container 9 reaches a position II, will a slowly increasing additional amount of backhaul cable 11 be required, and due to tension therein backhaul-cable drum 23 is correspondingly set in motion.

The movement of container 9 along the particulate matter vis-a-vis backhaul cable 11 is, in general not uniform as conveyance of the former proceeds and as it encounters a variable resistance, and as the particular slope of the particulate material causes deviations from the shortest path of conveyance. Should backhaul cable 11 thereby become slack and roll off from backhaul cable-drum 23, an uncontrollable unwinding of the backhaul cable and an additional slack portion thereof would result. For this reason induction brake 29 is activated during this phase, which delays a possible unwinding of backhaul cable-drum 23 via chain 26 and sprocket wheel 27 to a sufficient extent according to a preset value of a regulatable resistance, so that backhaul cable 11 remains guided tautly.

Upon container 9 reaching a position III on the rim of an active supply 40, a corresponding cam of cam switch 33 connected to backhaul cable-drum 23 activates a lamellar brake 30 which stops backhaul cable-drum 23; traction cable-drum 16, traction cable 10 and container 9 continue to be driven however. Container 9 will now be lifted up from the particulate matter along an arc with a radius $R_2$ formed by backhaul cable II via guide pulley 7. This movement is performed in the direction of feeder 2 and the particulate matter located in container 9 is forcibly unloaded into an active layer 40, wherefrom it can be withdrawn via a lock 38.

The forcible lifting of container 9 prevents the latter from slumping into active supply 40, even if that supply has vanished; no slack cable portion can therefore be formed during this phase of the movement of the container.

Traction cable 10 and backhaul cable 11 form a triangle during the lifting of container 9 enclosing an obtuse angle $\alpha$, the value of which increases as the lift of container 9 progresses and which finally approaches a value of 180°. Now the appropriately preset lamellar brake 30 permits a sliding movement of the cable and thus prevents and undue increase of cable tension.

The adjustment of displacement pump 13 assumes a value corresponding to an amount of zero conveyed-material in position IV, and hydraulic motor 15 and traction cable-drum 16 consequently come to a stop. Coupling 22 is closed at this moment by the corresponding cam in cam switch 33, and traction cable-drums 16 and 23 are now positively locked to each other. Lamellar brake 30 is opened, hydraulic motor 15 is set in motion in the opposite direction and container 9, swinging freely below derrick 6 is guided in a direction towards guide pulley 7. Concurrently hydraulic motor 15 is disconnected through displacement pump 13 and consequently traction cable-drum 16 and as well as traction cable 10 are brought to a halt. Container 9 moves to its starting position under its own weight through an arc of radius $R_4$ of traction cable 10 in a controllably delayed fashion as a result of the action of induction brake 29, and a new conveying process can begin.

I claim:

1. An apparatus for self-actuated scooping-up of particulate material disposed in a sector-shaped storage space radially around a feeder and stored thereagainst having a rotatable chassis associated therewith including a derrick having a free end being hingeably attached thereto and traction and backhaul cables for the movement of a container via independent cable-portions guided via respective cable drums and switches controlling the drive of said respective cable-drums for the forward and rearward conveyance of said container comprising:
    a guide pulley, said backhaul cable being prevented from being unwound and said cable drums including traction and backhaul cable drums, said traction cable being only wound around said traction cable-drum until a length of said backhaul cable hanging from said guide pulley is used up; and
    an active-supply partition separating a non-active supply of said particulate material from an active supply thereof, said backhaul cable-drum coupled to said traction cable-drum being thereupon decoupled therefrom and upon said container reaching said partition said backhaul cable drum being arrested, said traction cable-drum being kept running, said traction and backhaul cables enclosing an angle, said container hovering above said storage space being returned to said free end of said derrick upon said angle substantially approaching 180° and said traction and backhaul cable-drums concurrently turning in opposite directions.

2. An apparatus as defined in claim 2 further comprising:
    an electric motor;
    a displacement pump;
    a fluid motor; and
    a coupling, said electric motor driving said traction cable-drum via said displacement pump and said fluid motor, said traction cable-drum being positively coupled to said coupling disposed on said backhaul cable-drum and selectably couplable to, and decouplable from said backhaul cable-drum.

3. An apparatus as defined in claim 2 further comprising:
    second and third positively locking drives; and
    two cam switches, said traction and backhaul cables driving said respective cam switches via said displacement pump, said coupling and said respective brakes.

4. An apparatus as defined in claim 3 wherein said cam switches include respective shafts and said second and third drives move said respective traction and backhaul cables via said shafts in a one-to-one correspondence with the motion of respective perimeters of said shafts.

5. An apparatus as defined in claim 1 further comprising:
    induction and lamellar brakes; and
    a first positively-locking drive coupling said backhaul drum to said brakes, said induction brake holding said backhaul cable controllably taut during said scooping-up of said material and lowering of said container, and said lamellar brake arresting said backhaul cable-drum during the lifting of said container.

6. A method of self-actuated scooping-up of particulate material from a container held by traction and backhaul cables wound on respective traction and backhaul cable drums from a sector-shaped storage-space comprising the steps of:
    a. dragging said container held by said traction and backhaul cables along an upward slope of said particulate material for scooping-up a predetermined part thereof from an initial starting-position to a first-predetermined point on said slope;
    b. unwinding said backhaul cable from said backhaul cable drum, holding said backhaul cable taut upon completion of step (a) and continuing to drag said container from said first predetermined point to a second predetermined point on said slope marked by a partition;
    c. unloading the scooped-up material from said container into an active supply located beyond said partition in the direction of motion of said container upon completion of step (b), arresting the unwinding motion of said backhaul cable from said backhaul cable drum and lifting said container until the angle enclosed by said traction and backhaul cable reaches substantially 180°;

d. reversing the horizontal component of motion of said container upon completion of step (d) and holding said traction and backhaul cables taut until said container reaches a third predetermined point while hovering above said storage space;

e. arresting said unwinding motion of said backhaul cable from said backhaul cable-drum and allowing said traction cable to unwind from said traction cable-drum, said container thereby being swung through an arc downwards to a location having a horizontal coordinate substantially equal to the horizontal coordinate of said initial position; and f. unwinding said backhaul cable from said backhaul cable-drum and holding said backhaul cable taut in a controlled manner upon completion of step (e), the container thereby descending substantially to said starting position.

* * * * *